United States Patent
Jobson et al.

(10) Patent No.: US 7,033,969 B1
(45) Date of Patent: Apr. 25, 2006

(54) POROUS MATERIAL, METHOD AND ARRANGEMENT FOR CATALYTIC CONVERSION OF EXHAUST GASES

(75) Inventors: Edward Jobson, Romelanda (SE); John A. Martens, Huldenberg (BE); Anne Cauvel, Adissan (FR); Francois Jayat, Genac (FR)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/581,333

(22) PCT Filed: Dec. 10, 1997

(86) PCT No.: PCT/SE97/02067

§ 371 (c)(1),
(2), (4) Date: Oct. 6, 2000

(87) PCT Pub. No.: WO99/29400

PCT Pub. Date: Jun. 17, 1999

(51) Int. Cl.
*B01J 29/06* (2006.01)

(52) U.S. Cl. ............................ 502/66; 502/64; 502/67; 502/69; 502/74; 502/78

(58) Field of Classification Search ................ 502/60, 502/64, 66, 67, 69, 74, 78
See application file for complete search history.

(56) References Cited

U.S. PATENT DOCUMENTS

| 3,901,821 | A | | 8/1975 | Retallick ................... 252/410 |
|---|---|---|---|---|
| 4,582,650 | A | * | 4/1986 | Felthouse .................... 502/74 |
| 5,278,114 | A | * | 1/1994 | Wielers et al. ............... 502/67 |
| 5,407,880 | A | * | 4/1995 | Ikeda et al. ............. 423/239.2 |
| 5,465,574 | A | | 11/1995 | Ma ............................. 60/300 |
| 5,665,321 | A | * | 9/1997 | Campbell et al. ........... 423/210 |
| 5,702,675 | A | * | 12/1997 | Takeshima et al. ...... 423/213.5 |
| 5,744,103 | A | * | 4/1998 | Yamada et al. ............. 422/171 |
| 5,934,072 | A | * | 8/1999 | Hirota et al. ................ 60/278 |
| 5,985,238 | A | * | 11/1999 | Pasquale et al. ............ 423/706 |
| 6,147,023 | A | * | 11/2000 | Hirayama et al. ............ 502/64 |
| 6,294,141 | B1 | * | 9/2001 | Twigg et al. ................ 422/169 |
| 2003/0069125 | A1 | * | 4/2003 | Tissler et al. ................. 502/60 |

FOREIGN PATENT DOCUMENTS

| EP | 0 483 708 A1 | 5/1991 |
|---|---|---|
| EP | 0 445 408 A1 | 9/1991 |
| EP | 0 499 931 A1 | 8/1992 |
| EP | 0 682 975 A1 | 11/1995 |
| JP | 5-59941 | * 3/1993 |
| JP | 7-144128 | * 6/1995 |
| WO | 97/49480 | 12/1997 |

OTHER PUBLICATIONS

Tzou, M.S.,; Teo, B.K.; Sachtler, W.M.H., "Formation of Pt Particles in Y-Type Zeolites," Journal of Catalysis 113, pp. 220-235 (1988).

Homeyer, S.T. and Sachtler, W.M.H., "Elementary Steps in the Formation of Highly Dispersed Palladium in NaY; 1. Pd Ion Coordination and Migration," Journal of Catalysis 117, PPL 91-101 (1989).

* cited by examiner

*Primary Examiner*—Christina Johnson
(74) *Attorney, Agent, or Firm*—Lerner, David, Littenberg, Krumholz & Mentlik LLP; Damian Porcari

(57) ABSTRACT

Porous materials are disclosed for use in the catalytic conversion of exhaust gases comprising a carrier including a first porous structure, an oxidation catalyst capable of catalyzing the oxidation of NO to $NO_2$ in the presence of oxygen and catalyzing the oxidation of reducing agent, the oxidation catalyst enclosed within the first porous structure, the first porous structure including pores having dimensions such that the reducing agent is substantially prevented from contacting the oxidation catalyst, whereby the oxidation catalyst primarily catalyses the oxidation of NO to $NO_2$ as compared to oxidation of the reducing agent during the catalytic conversion of the exhaust gases. Methods for catalytic conversion or exhaust gases using these materials are also disclosed.

48 Claims, 7 Drawing Sheets

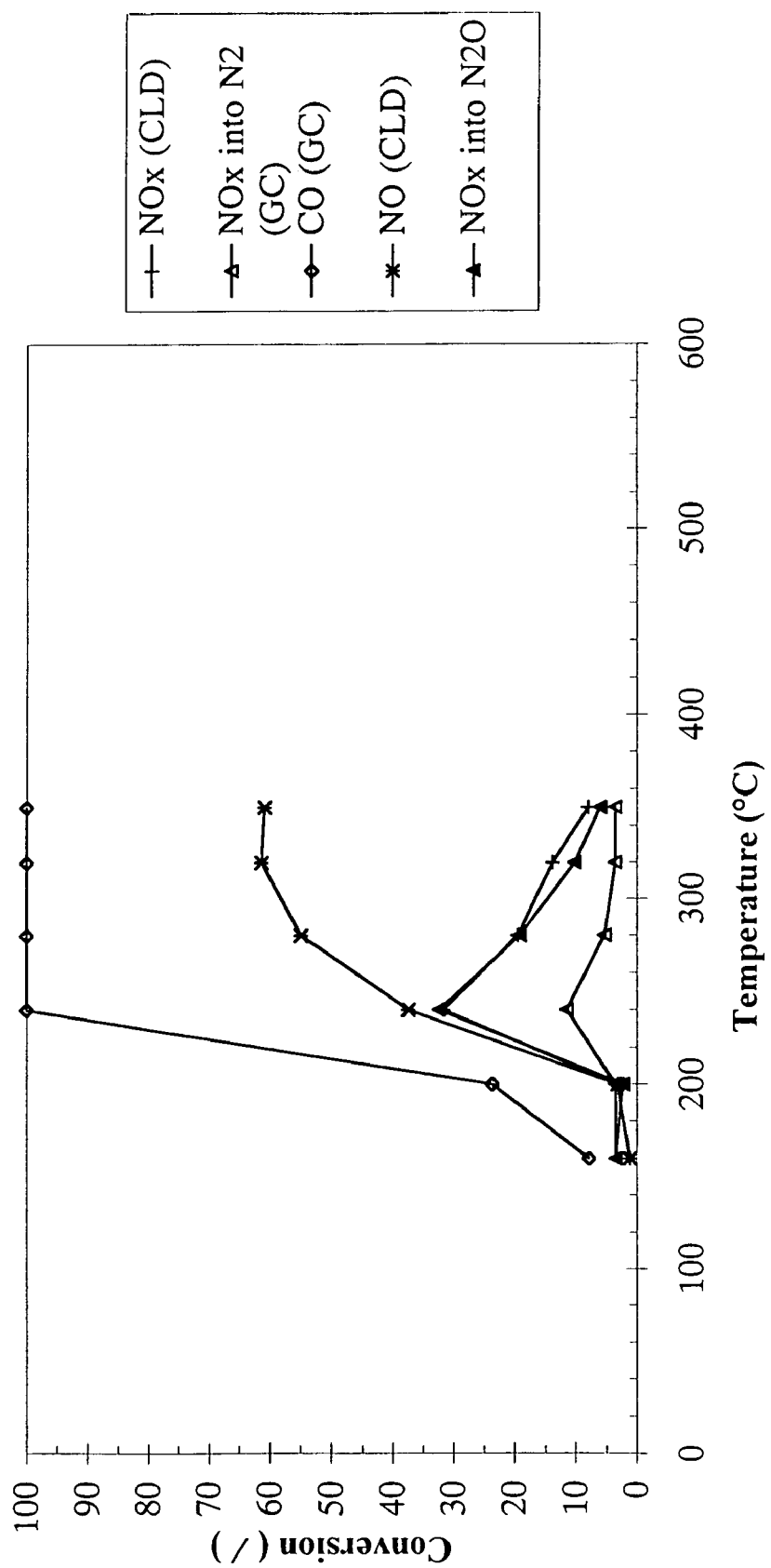
Graph 1A
0.5wt% Pt-FER/5wt% Ag-FER (COK-Si/Al=6) (30/70)
(350 ppm $C_8H_{18}$, 500 ppm NO, VHSV = 60,000 $h^{-1}$)

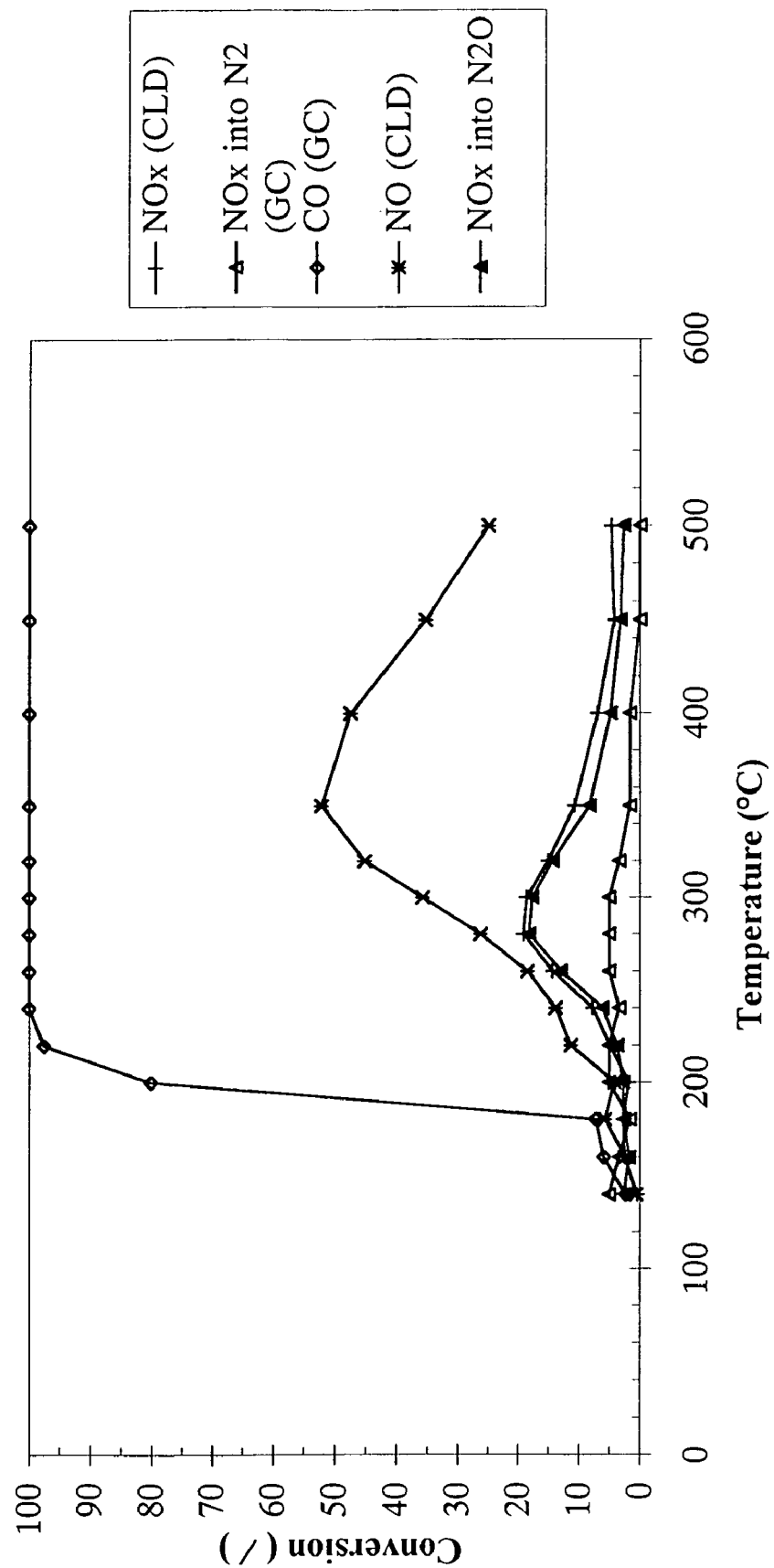

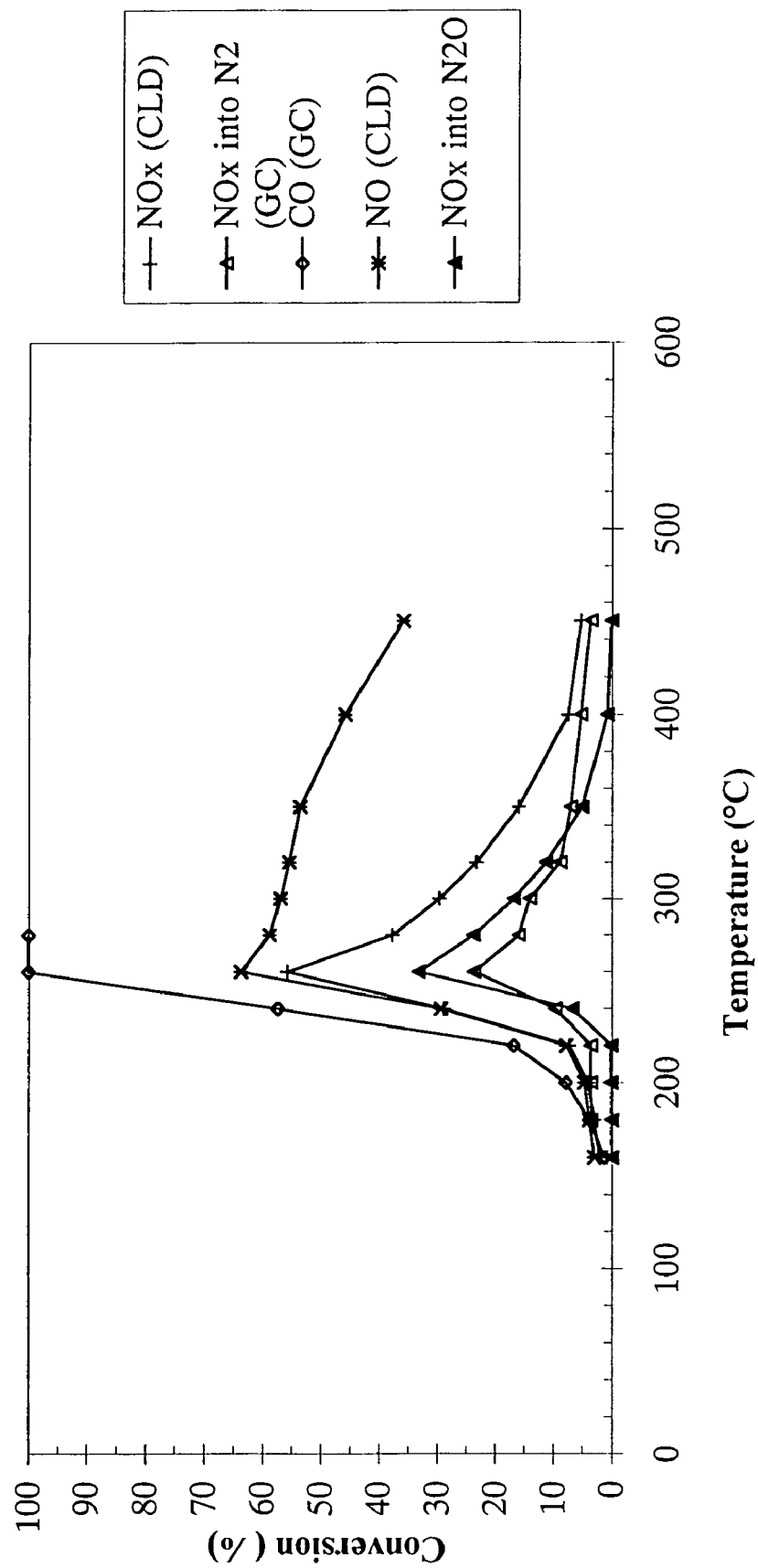

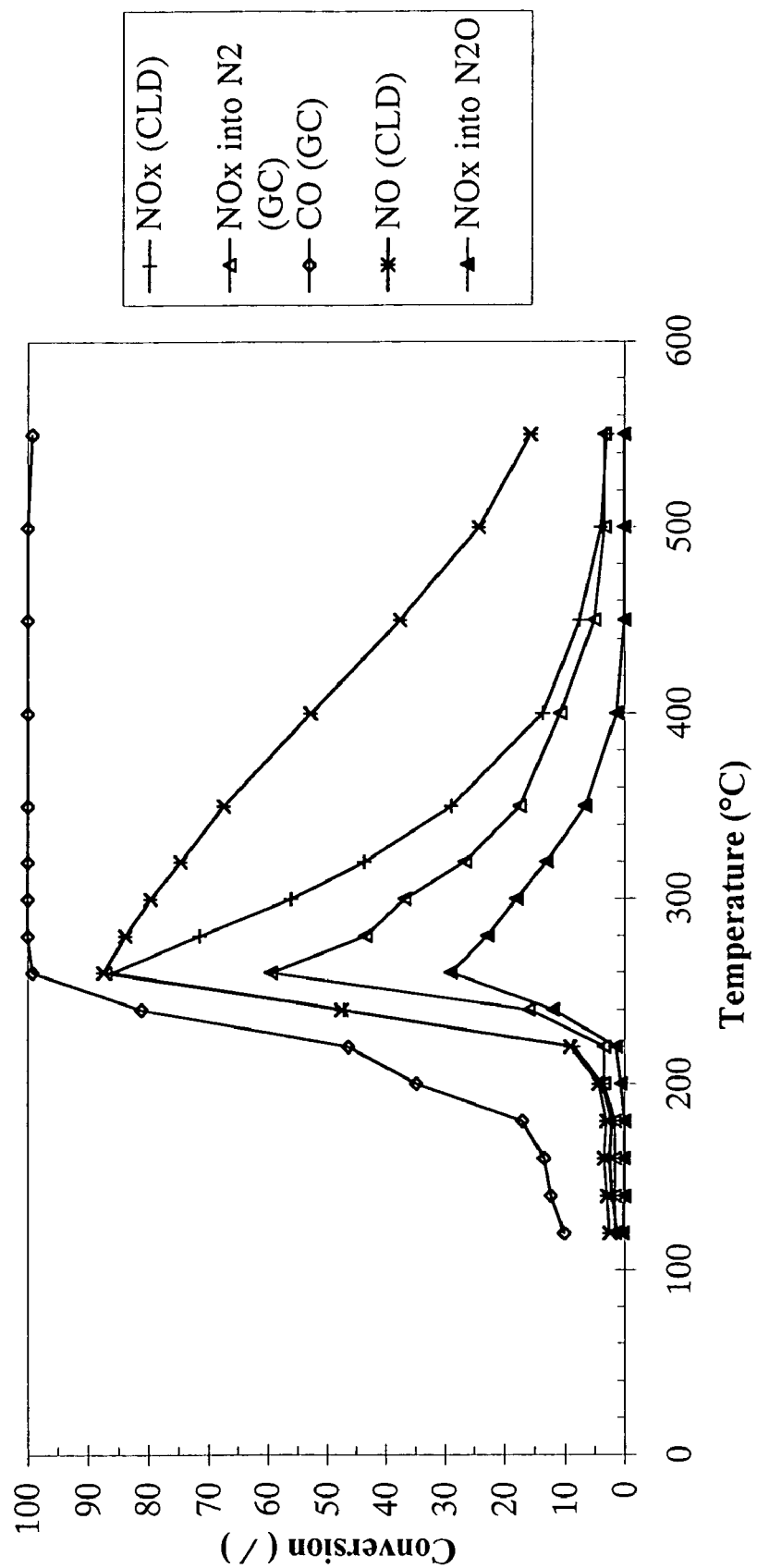

POROUS MATERIAL, METHOD AND ARRANGEMENT FOR CATALYTIC CONVERSION OF EXHAUST GASES

FIELD OF THE INVENTION

The present invention relates to a porous material for the catalytic conversion of exhaust gases. The porous material comprises a carrier with a first porous structure, and an oxidation catalyst which, in the presence of oxygen, has the ability to catalyse oxidation of nitrogen monoxide into nitrogen dioxide. The oxidation catalyst in itself also has the ability to catalyse oxidation of a reducing agent but, according to the present invention, oxidation of the reducing agent is prevented by means of the oxidation catalyst being enclosed inside the first porous structure, which has dimensions such that the reducing agent is sterically prevented from coming into contact with the oxidation catalyst.

Preferably, the porous material also comprises a carrier with a second porous structure and a reduction catalyst, which in the presence of the reducing agent is able to selectively catalyse reduction of nitrogen dioxide into nitrogen, whereby the reducing agent is at least partially consumed. The reduction catalyst is thereby located in the second porous structure, which has dimensions such that the reducing agent can come into contact with the reduction catalyst. The present invention also relates to a method and an arrangement which utilize the porous material, and provides for advantageous use of the porous material.

The present invention may be applied within the field of catalytic conversion of exhaust gases which originate from internal combustion engines, particularly Lean Combustion engines (LC-engines) and diesel engines.

The present invention may also be utilized for other exhaust gases, containing nitrogen oxides and having an oxygen surplus, which originate from stationary emission sources such as gas turbines, power plants and the like.

BACKGROUND OF THE INVENTION

When attempting to reduce the emissions of nitrogen oxides ($NO_x$) from internal combustion engines, many efforts have been made to modify the combustion conditions in order to reduce the $NO_x$-emissions, while still maintaining the combustion efficiency at a satisfactory level.

Among the traditional techniques used for the reduction of $NO_x$-emissions, inter alia, the technique of Exhaust Gas Recirculation (EGR) may be mentioned, as well as special designs of fuel injectors and combustion chambers. Other important parameters are compression, fuel injection time and fuel injection pressure. Techniques involving water injection, the use of fuel/water emulsions, and so-called Selective Catalytic Reduction (SCR) by ammonia, have also been employed. It has thus been found that a one-sided optimization of the combustion efficiency often results in increased $NO_x$-emissions.

It is presently required that both the fuel consumption and the $NO_x$-emissions be reduced. There are also strong demands on reduced emissions of other chemical compounds which are potentially hazardous to the environment, e.g. hydrocarbons.

Accordingly, there is an increased need for catalytic converters which are also able to treat exhaust gases from so-called Lean Combustion (LC) engines. Therefore, a number of different catalytic converters have been developed and are well-known from commercial applications in e.g. motor vehicles.

Typically, conventional catalytic converters comprise one or several matrices, or monolith bricks as they are sometimes called. Such bricks or monoliths are in the form of a ceramic honeycomb substrate, with through passages or cells, and which can be furnished with a porous surface coating. Particles of a suitable catalyst are embedded in the surface of the matrix, and the design of the matrix has been optimized in order to maximise the surface area over which catalytic reactions take place. Common catalysts are noble metals, e.g. silver (Ag), platinum (Pt), palladium (Pd), rhodium (Rh), gallium (Ga) or ruthenium (Ru) or mixtures thereof. There are also a number of other metals and metal oxides which may be used as catalysts. Such catalysts may have the ability to catalyse oxidation or reduction reactions, or both.

It is also previously known to use crystalline aluminium silicates, so-called zeolites, loaded with a suitable catalyst. The use of zeolites in connection with the catalytic conversion of exhaust gases is disclosed, e.g in European Application Nos. 499,931 A1 and 445,408 A.

Furthermore, it is also known to combine several different catalytic matrices, or to arrange a so-called after-burner in the catalytic conversion process. Such arrangements are disclosed, e.g. in U.S. Pat. No. 5,465,574.

It is also known to use a honeycomb monolith of corrugated metal foil, having a suitable catalyst carried or supported on its surface.

It has also been suggested, e.g. in European Application No. 483,708 A1, to combine a conventional ceramic catalytic converter with an electrically heatable catalytic converter, in order to ensure that the optimum temperature for catalytic conversion is maintained.

Thus, a number of different catalyst materials, devices, and arrangements for the catalytic conversion of exhaust gases have been described in the art.

It is therefore believed that simultaneous elimination of nitrogen oxides ($NO_x$) and hydrocarbons ($H_xC_y$) may take place over e.g. an Ag-catalyst, according to the following (simplified) chemical reactions:

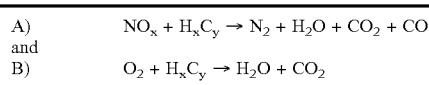

However, in practice, it has been found that the following reaction is predominant:

It should be noted that the term $H_xC_y$ in these chemical reactions not only refers to hydrocarbons but is also relevant for other reducing agents which further comprise oxygen and/or sulphur. Accordingly, the reducing agent $H_xC_y$ could also be expressed as $H_xC_yO_zS_w$. Examples of reducing agents which might be present in exhaust gases are alkanes, alkenes, paraffins, alcohols, aldehydes, ketones, ethers or esters, and different sulphur-containing compounds. Also CO or $H_2$ could act as reducing agents. The reducing agent in the exhaust gases can originate from the fuel or the combustion air, or it can be added to the exhaust gases on purpose.

It has been found that the above-mentioned reaction according to C) is very rapid over e.g. Ag-catalysts. Acidic catalysts ($H^+$) and acidic zeolites, doped with Ag or other suitable catalysts, have been found to be selective in the sense that $NO_2$ will readily be converted, whereas NO will not. This can be a great disadvantage, since NO is predominant in "lean" exhaust gases from e.g. LC-engines. Another problem is that the available amount of $NO_2$ can become limiting for the reduction of hydrocarbons ($H_xC_y$) or other undesired compounds.

In order to solve this problem, i.e. to be able to reduce the amount of both NO and $H_xC_y$ in the exhaust gases, it has been suggested to combine an Ag-zeolite catalyst with a Pt-catalyst. Normally, the following main reactions will take place over a conventional Pt-catalyst:

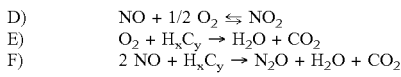

| | |
|---|---|
| D) | $NO + 1/2\ O_2 \leftrightarrows NO_2$ |
| E) | $O_2 + H_xC_y \rightarrow H_2O + CO_2$ |
| F) | $2\ NO + H_xC_y \rightarrow N_2O + H_2O + CO_2$ |

When using a conventional Ag-zeolite catalyst in combination with a conventional Pt-catalyst, all four reactions C), D), E) and F) will occur. However, since hydrocarbons ($H_xC_y$) are consumed in the chemical reactions E) and F), there is a risk that there will not be a sufficient amount of hydrocarbon ($H_xC_y$) left for the reaction with nitrogen dioxide ($NO_2$), according to reaction C). This results in an undesired residue of nitrogen dioxide ($NO_2$) in the catalytically converted exhaust gases, originating from reaction D).

Previous attempts have been made to solve this problem with different types of catalysts, by means of combining different catalysts, and by means of adding an additional amount of hydrocarbon to the exhaust gases in order to supply the reaction C) with a sufficient amount of hydrocarbon.

However, many of the previous solutions have been associated with the problem of undesired oxidation of hydrocarbons ($H_xC_y$) over at least some surfaces of the oxidation catalyst, which preferably should only catalyse oxidation of nitrogen monoxide (NO) into nitrogen dioxide ($NO_2$), according to reaction D).

Another problem associated with many previously known catalysts is that, during certain conditions, they will catalyse reaction F), which produces dinitrogen oxide ($N_2O$). This reaction is undesired, and it is preferred that the nitrogen oxides ($NO_x$) in the exhaust gases are converted into nitrogen ($N_2$) to the highest possible degree, and not into dinitrogen oxide ($N_2O$).

Accordingly, there is a need for a new, selective oxidation catalyst material, which catalyses oxidation of nitrogen monoxide (NO) into nitrogen dioxide ($NO_2$) and which does not catalyse oxidation of hydrocarbons.

Furthermore, there is also a need for an effective combination of such a selective oxidation catalyst material, catalysing a reaction which produces nitrogen dioxide ($NO_2$), and a reduction catalyst material, catalysing a reaction in which nitrogen dioxide ($NO_2$) is reduced by hydrocarbons or other reducing agents into nitrogen ($N_2$).

Accordingly, one object of the present invention is to provide a porous material for catalytic conversion of exhaust gases, by means of which porous material it is possible to selectively catalyse the oxidation of nitrogen monoxide (NO) into nitrogen dioxide ($NO_2$), and avoid catalytic oxidation of hydrocarbons ($H_xC_y$) or other reducing agents.

A second object of the present invention is to provide a porous material for catalytic conversion of exhaust gases, wherein primarily only the desired reactions take place, as is a result of which the contents of NO, $NO_2$ and $H_xC_y$ in the catalytically converted exhaust gases are effectively decreased, and the resulting conversion products primarily are $N_2$, $CO_2$ and $H_2O$, and not $N_2O$.

A third object of the present invention is to provide a method for the catalytic conversion of exhaust gases in which such a porous material is utilized.

A fourth object of the present invention is to provide an advantageous use of porous materials therefore.

A fifth object of the present invention is to provide an advantageous arrangement for the catalytic conversion of exhaust gases utilizing such a porous material.

SUMMARY OF THE INVENTION

In accordance with the present invention these and other objects have now been realized. In accordance with the present invention a porous material has been discovered for use in the catalytic conversion of exhaust gases comprising a carrier including a first porous structure, an oxidation catalyst capable of catalyzing the oxidation of NO to $NO_2$ in the presence of oxygen and catalyzing the oxidation of a reducing agent, the oxidation catalyst enclosed within the first porous structure, the first porous structure including pores having dimensions such that the reducing agent is substantially prevented from contacting the oxidation catalyst, whereby the oxidation catalyst primarily catalyzes the oxidation of the NO to $NO_2$ as compared to the oxidation of the reducing agent during the catalytic conversion of the exhaust gases. In accordance with a preferred embodiment the carrier includes a second porous structure, and including a reduction catalyst capable of selectively catalyzing the reduction of NO to $N_2$ in the presence of a reducing agent, the reduction catalyst disposed in the second porous structure, the second porous structure including pores having a dimension such that the reducing agent can contact the reduction catalyst, whereby the reduction catalyst can catalyze the reduction of $NO_2$ to $N_2$ in the presence of the reducing agent.

In accordance with a preferred embodiment of the porous material of the present invention the pores of the first porous structure are generally smaller than the pores of the second porous structure. Preferably, the pores of the first porous structure have an effective size of from about 3–6 angstroms.

In accordance with another embodiment of the porous material of the present invention the first and second porous structures are provided in the same layer or coating of the porous material.

In accordance with another embodiment of the porous material of the present invention the first and second porous structures are provided in different layers or coatings of the porous material.

In accordance with another embodiment of the porous material of the present invention the carrier including the second porous structure has been adapted to the molecular size or absorption properties of the reducing agent.

In accordance with another embodiment of the porous material of the present invention the ratio of the oxidation catalyst to the reduction catalyst is optimized, whereby the oxidation of NO to $NO_2$ substantially corresponds to the reduction of $NO_2$ to $N_2$.

In accordance with another embodiment of the porous material of the present invention the porous material includes a first portion of the porous material disposed to initially receive the exhaust gas and a second portion of the porous material disposed to subsequently receive the exhaust gas, and wherein the first portion of the porous material includes more of the oxidation catalyst than the reduction catalyst and the second portion of the porous material includes more of the reduction catalyst than the oxidation catalyst.

In accordance with another embodiment of the porous material of the present invention at least one of the first and second porous structures is disposed in the carrier comprising a zeolite crystal structure. Preferably the first porous structure is disposed in a carrier comprising a first zeolite and the second porous structure is disposed in a carrier comprising a second zeolite. In a preferred embodiment the porous material comprises a physical mixture of the first and second zeolites.

In accordance with another embodiment of the porous material of the present invention, the porous material comprises a layered structure comprising layers of the first and second zeolites. Preferably, the layers of the first and second zeolites are arranged so that the second zeolite structure will contact the exhaust gases before the first zeolite structure.

In accordance with another embodiment of the porous material of the present invention the second zeolite is applied by overgrowth onto the first zeolite.

In accordance with another embodiment of the porous material of the present invention the content of the oxidation catalyst in the outer layers of the first zeolite has been reduced by means of regulating the penetration depth or dispersion thereof.

In accordance with another embodiment of the porous material of the present invention the porous material includes an additional crystal zeolite layer crystallized onto the first zeolite, the additional crystal zeolite layer including a reduced content of the oxidation catalyst.

In accordance with another embodiment of the porous material of the present invention the first zeolite comprises crystal grains having optimized crystal grain sizes and shapes, whereby access of the reducing agent thereto is reduced and the effective oxidation of the NO to $NO_2$ is carried out.

In accordance with another embodiment of the porous material of the present invention the first zeolite is Ferrierite or Chabazite.

In accordance with another embodiment of the porous material of the present invention the reducing agent is a hydrocarbon or a hydrocarbon including oxygen and/or sulfur.

In accordance with another embodiment of the porous material of the present invention the reduction catalyst comprises an acidic zeolite catalyst, preferably a Brönstedt acid catalyst, such as silver, copper, Rhodium, Indium, Iridium or combinations thereof.

In accordance with another embodiment of the porous material of the present invention the oxidation catalyst is platinum, palladium or mixtures thereof.

In accordance with another embodiment of the porous material of the present invention the porous material includes a substrate, wherein at least one of the first and second porous structures are provided on the carrier attached to the substrate.

In accordance with the present invention a method has also been provided for the catalytic conversion of exhaust gases comprising oxidation of NO to $NO_2$ over an oxidation catalyst capable of oxidizing the NO to $NO_2$ in the presence of oxygen and of oxidizing a reducing agent, and sterically preventing the reducing agent from contacting the oxidation catalyst, whereby the oxidation catalyst primarily catalyzes the NO to $NO_2$ as compared to oxidation of the reducing agent.

In a preferred embodiment, the method includes reduction of NO to $N_2$ over a reduction catalyst capable of reducing the $NO_2$ to $N_2$ in the presence of the reducing agent, whereby the reducing agent is at least partially consumed in order to provide a catalytically converted exhaust gas having a reduced content of NO, $NO_2$ and the reducing agent, and a proportionately reduced amount of $N_2O$ and CO.

In accordance with one embodiment of the method of the present invention the method includes adding an additional amount of the reducing agent prior to the reduction over the reduction catalyst. Preferably, the method includes determining the content of the reducing agent or the amount of the NO in the exhaust gases and providing the additional amount of the reducing agent based thereon. In a preferred embodiment the method includes determining the status of the catalytic conversion based on the determined amount of the reducing agent or the NO. Preferably, determining of the status of the catalytic conversion is carried out in a diagnostic control system.

In accordance with one embodiment of the method of the present invention the method includes initially passing the exhaust gases through a device for storing and releasing nitrous oxides prior to the oxidation over the oxidation catalyst.

In accordance with another embodiment of the method of the present invention the method includes initially passing the exhaust gases through a device for storing and releasing the reducing agent prior to the oxidation over the oxidation catalyst.

In accordance with another embodiment of the method of the present invention the method includes regulating the temperature of the exhaust gases in order to ensure that the temperature is within the active temperature interval of the oxidation catalyst and the reduction catalyst.

In accordance with another embodiment of the method of the present invention the method includes passing the at least partially catalytically converted exhaust gases over a second oxidation catalyst, whereby oxidation of residues of the reducing agent and CO can occur.

In accordance with another embodiment of the method of the present invention the exhaust gases arise from an internal combustion engine, and the reducing agent comprises a hydrocarbon or a hydrocarbon containing oxygen or sulfur. Preferably, the method includes regulating the fuel consumption of the internal combustion engine in order to regulate the composition of the exhaust gases and to regulate the residue of nitrous oxides in the catalytically converted exhaust gases.

In accordance with another embodiment of the method of the present invention the internal combustion engine comprises a diesel engine and the reducing agent originates from internal combustion in the diesel engine. Preferably, the method includes adding an additional amount of the reducing agent by means of a fuel injector for the diesel engine or by an injector for the additional reducing agent.

Thus, the first object of the present invention is achieved by means of a porous material for catalytic conversion of exhaust gases which comprises a carrier with a first porous structure, and an oxidation catalyst. In the presence of oxygen, the oxidation catalyst has the ability to catalyse oxidation of nitrogen monoxide into nitrogen dioxide, according to a first reaction. Furthermore, the oxidation catalyst in itself has the ability to catalyse oxidation of a reducing agent, according to a second reaction. According to the present invention, the oxidation catalyst is enclosed inside the porous structure, which has dimensions such that the reducing agent is sterically prevented from coming into contact with the oxidation catalyst. This will enable primarily the first reaction, out of said first and second reactions, to take place over the oxidation catalyst during the catalytic conversion of the exhaust gases.

The second object of the present invention is achieved by means of a porous material which further comprises a carrier with a second porous structure and a reduction catalyst. In the presence of a reducing agent, the reduction catalyst is able to selectively catalyse reduction of nitrogen dioxide into nitrogen, according to a third reaction, whereby the reducing agent participates in the third reaction and is at least partially consumed. Thereby, the reduction catalyst is located in the second porous structure, which has dimensions such that the reducing agent can come into contact with the reduction catalyst in order to enable the third reaction to take place.

The third object of the present invention is achieved by means of a method for catalytic conversion of exhaust gases which comprises oxidation of nitrogen monoxide into nitrogen dioxide over an oxidation catalyst, according to a first reaction, whereby the oxidation catalyst also has the ability to, according to a second reaction, catalyse oxidation of a reducing agent. According to the present invention, however, the reducing agent is sterically prevented from coming into contact with the oxidation catalyst, as a result of which primarily the first reaction, out of said first and second reactions, takes place over the oxidation catalyst.

In accordance with the present invention, the fourth object is achieved by the use of a porous material according to the present invention, providing functions both for the oxidation of nitrogen monoxide into nitrogen dioxide and for the reduction of nitrogen dioxide into nitrogen, for catalytic conversion of exhaust gases which have an oxygen surplus.

In accordance with the present invention, the fifth object of the present invention is achieved by an arrangement, for catalytic conversion of exhaust gases from an internal combustion engine, comprising a porous material according to the present invention.

BRIEF DESCRIPTION OF THE DRAWINGS

The present invention will be more fully appreciated with reference to the following detailed description, which refers to the attached drawings and graphs, in which.

Graph 1A is a graphical representation of results from a laboratory evaluation of a porous sample, comprising a physical mixture of Pt-Ferrierite and Ag-Ferrierite, when a linear hydrocarbon is supplied in the gas which is to be catalytically converted;

Graph 1B is a graphical representation of results from a laboratory evaluation of the same porous sample as in Graph 1A, but when a branched hydrocarbon is supplied in the gas which is to be catalytically converted;

Graph 2A is a graphical representation of results from a laboratory evaluation of a porous material according to the present invention, comprising a physical mixture of Pt-Ferrierite and Ag-Mordenite, when a linear hydrocarbon is supplied in the gas which is to be catalytically converted; and Graph 2B is a graphical representation of results from a laboratory evaluation of the same porous material according to the present invention as in Graph 2A, but when a branched hydrocarbon is supplied in the gas which is to be catalytically converted.

DETAILED DESCRIPTION

In the following detailed description, a porous material according to the present invention will be described with reference to the attached drawings.

Figure 1:
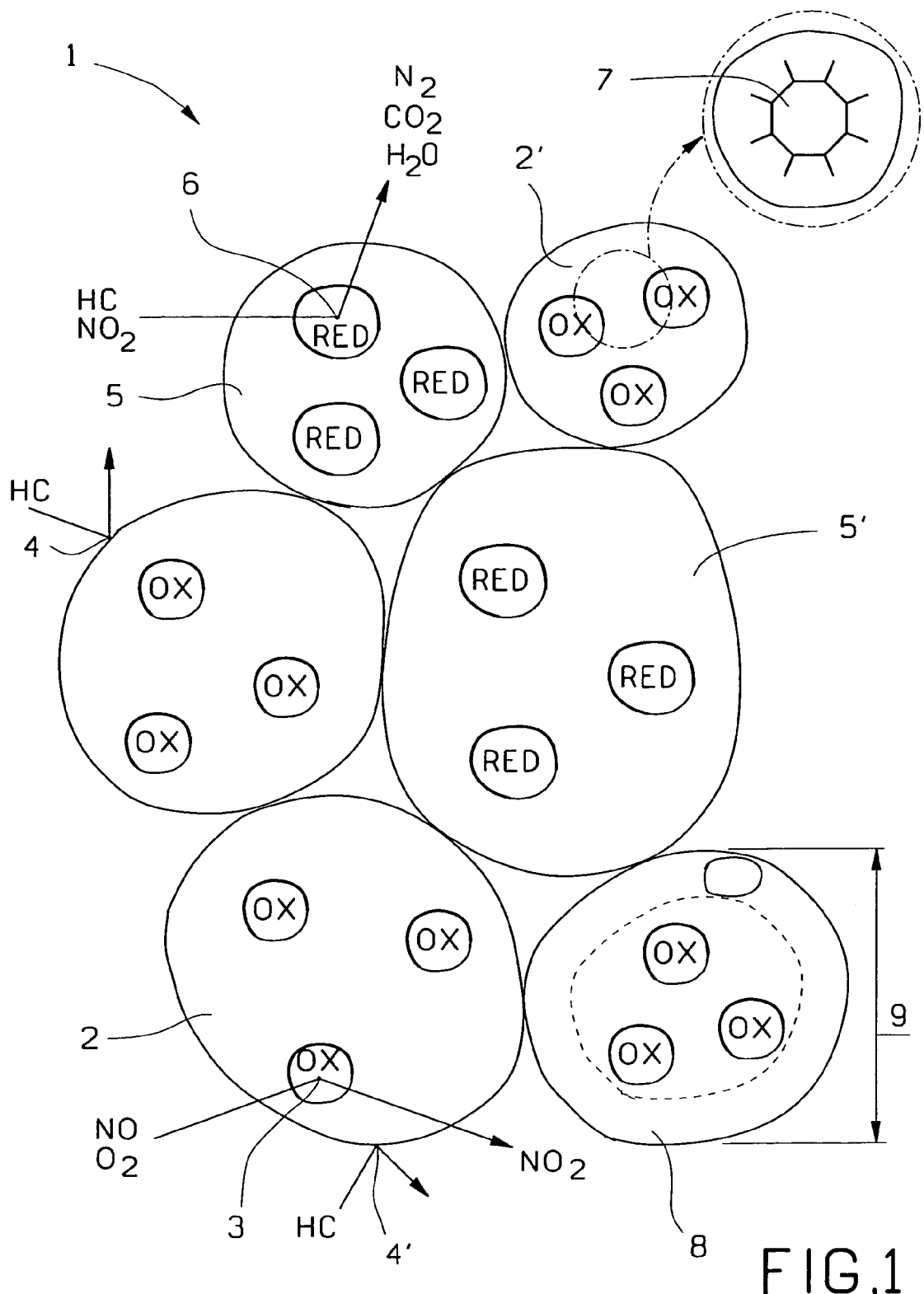
FIG. 1 is schematic representation of a portion of a porous material according to the present invention, showing an enlarged view as seen from inside a pore in the porous material. The major chemical reactions which occur during the catalytic conversion of exhaust gases are also indicated.
Figure 2:
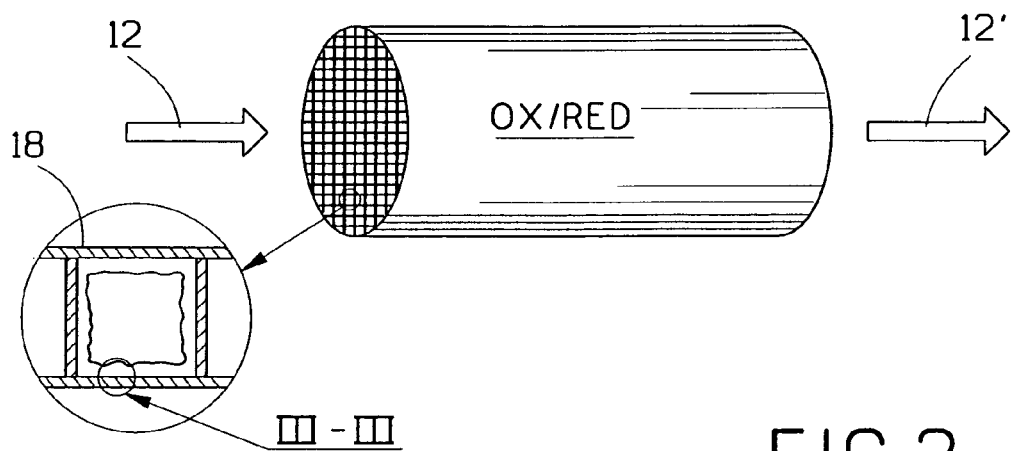
FIG. 2 is a side, perspective, schematic representation of one embodiment of the porous material according to the present invention, with an enlarged detailed view of a portion of the porous material including a supporting substrate.

The porous material 1 in FIG. 1 comprises a carrier with a first porous structure 2, 2'. An oxidation catalyst (OX) is enclosed inside the first porous structure 2, 2'. In the presence of oxygen ($O_2$), the oxidation catalyst (OX) has the ability to catalyse oxidation of nitrogen monoxide (NO) into nitrogen dioxide ($NO_2$), according to a first reaction 3. Furthermore, the oxidation catalyst (OX) in itself has the ability to catalyse oxidation of a reducing agent (HC), according to a second reaction (not present in FIG. 1).

According to the present invention, however, oxidation of the reducing agent according to the second reaction is not desired, since the reducing agent (HC) is more useful in a third reaction, as will become apparent below.

In order to prevent the undesired second reaction from occurring, the oxidation catalyst (OX) is enclosed inside the first porous structure 2, 2', which has dimensions such that the reducing agent (HC) is sterically prevented, 4, 4', from coming into contact with the oxidation catalyst (OX). This will enable primarily the desired first reaction 3, out of said first and second reactions, to take place over the oxidation catalyst (OX) during the catalytic conversion of exhaust gases. In this context, the term "first porous structure" primarily refers to internal micro-pores in the carrier material or micro-pores between carrier particles or grains.

Preferably, the porous material 1 further comprises a carrier with a second porous structure 5, 5', in which a reduction catalyst (RED) is located. In this context, the term "second porous structure" can include internal micro-pores in the carrier material, or cavities or channels between carrier particles, but also cavities inside or channels through the porous material, i.e. macro-pores. In the presence of a reducing agent (HC), the reduction catalyst (RED) is able to selectively catalyse reduction of nitrogen dioxide ($NO_2$) into nitrogen ($N_2$), according to a third reaction 6, shown schematically in FIG. 1. Thereby, the reducing agent (HC) participates in the third reaction 6 and is at least partially consumed.

According to the present invention, the reduction catalyst (RED) is located in the second porous structure 5, 5', which has dimensions such that the reducing agent (HC) can come into contact with the reduction catalyst (RED). This enables the desired third reaction 6 to take place during the catalytic conversion of exhaust gases.

According to one embodiment of the porous material according to the present invention, the first porous structure 2, 2' on an average exhibits smaller entrances 7 for the reducing agent (HC) than the second porous structure 5, 5'. In this manner, the reducing agent (HC) is prevented from coming into contact with the oxidation catalyst (OX), enclosed inside the first porous structure 2, 2', but is not prevented from coming into contact with the reduction catalyst (RED) in the second porous structure 5, 5'. The pores in the first porous structure 2, 2' should preferably primarily have an effective size of from about 3 to 6 Å.

According to another embodiment of the porous material, both the first 2, 2' and the second 5, 5' porous structures are provided in the same layer or coating of the porous material.

If desired, however, the first 2, 2' and the second 5, 5' porous structures can be provided in different layers/coatings of the porous material. This might be an advantage, depending on the composition of the exhaust gases which are to be catalytically converted.

In one embodiment of the porous material, the carrier with the second porous structure 5, 5' is adapted to the molecule size and/or the adsorption properties of the reducing agent (HC) or agents, which is/are expected to occur in the exhaust gases.

In another embodiment of the porous material, the ratio between the oxidation catalyst (OX) and the reduction catalyst (RED) has been optimized so that the production of nitrogen dioxide ($NO_2$), according to the first reaction 3, essentially corresponds to the consumption of nitrogen dioxide ($NO_2$), according to the third reaction 6.

Figure 4A:
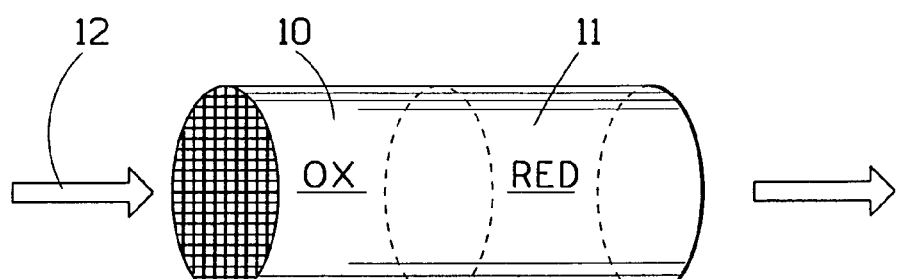
FIG. 4A is a side, perspective, schematic representation of an embodiment of a porous material according to the present invention, having a first portion and a second portion.
Figure 4B:
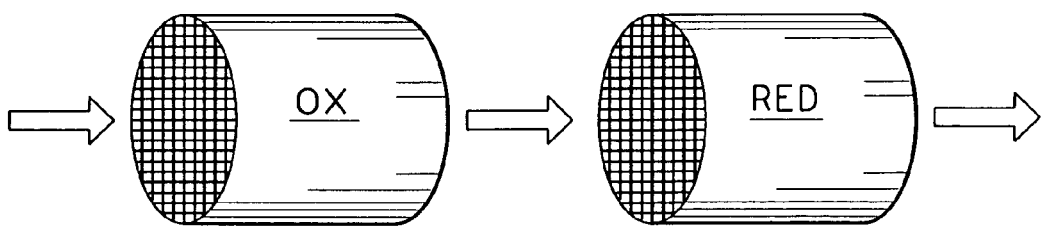
FIG. 4B is a side, perspective, schematic representation of another embodiment of the present invention, wherein the porous material according to the present invention comprises two separate, different parts, intended to be used together in a single catalytic conversion process.

In still another embodiment of the present invention (FIG. 4A), the porous material further comprises a first portion 10 and a second portion 11, wherein the first portion 10 is intended to receive exhaust gases 12 before the second portion 11 during the catalytic conversion. Thereby, the first portion 10 contains a larger quantity of the oxidation catalyst (OX) than the second portion 11, whereas the second portion 11 contains a larger quantity of the reduction catalyst (RED) than the first portion 10. Accordingly, in a flow of exhaust gases the first reaction 3, producing $NO_2$ 1 will take place upstream the third reaction 6, which consumes $NO_2$. As shown in FIG. 4B, it also conceivable with embodiments wherein the first and second portions are separated from each other, as long as they used for catalytic conversion in the same conversion process.

According to one embodiment of the porous material, the first 2, 2' and/or the second 5, 5' porous structure is provided in a carrier which is a zeolite crystal structure.

Furthermore, both the first 2, 2' and the second 5,5' porous structures can be provided in carriers of zeolite type, wherein preferably the first porous structure 2, 2' is provided in a first zeolite 14 and the second porous structure in a second zeolite 15.

As earlier mentioned, according to the present invention, the first porous structure 2, 2' and, accordingly, also the first zeolite 14 should provide suitable properties in order to prevent the earlier-mentioned, undesired second reaction from taking place.

Figure 3A:
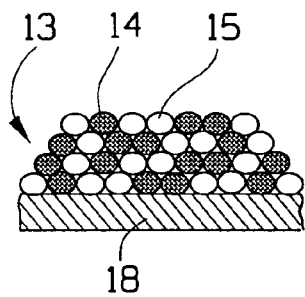
FIG. 3A is a schematic representation of an enlarged detailed view of a portion of the enlarged detailed view shown in FIG. 2, depicting a variant of the porous material according to the present invention, comprising a physical mixture of two different zeolite carriers.

There are a number of different ways of combining different zeolites in a porous material according to the present invention. Accordingly, the porous material can comprise a physical mixture 13 of the first zeolite 14 and the second zeolite 15 (FIG. 3A).

Figure 3B:
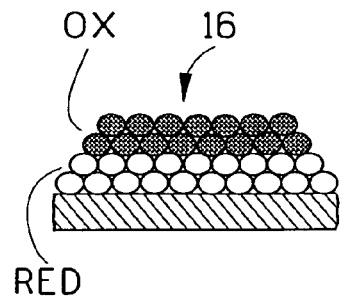
FIG. 3B is a schematic representation of another enlarged detailed view of a portion of the enlarged detailed view shown in FIG. 2, depicting another variant of the porous material according to the present invention, comprising a layered structure of two different zeolite carriers.
Figure 3C:
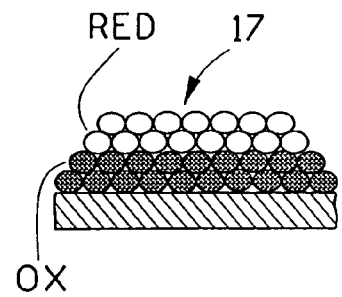
FIG. 3C is a schematic representation of an alternative to the layered structure in FIG. 3B.

Furthermore, the porous material can comprise a layered structure, 16 and 17, of the first zeolite and the second zeolite (FIGS. 3B and 3C). Different layers may also be applied or coated onto different supporting substrates 18 or different surfaces of a substrate 18.

In certain applications, it may be preferred to arrange the layered structure 17 so that, in a flow of exhaust gases, the second zeolite will encounter the exhaust gases before the first zeolite. This might be the case e.g. when the exhaust gases which are to be converted contain a proportionately high content of $NO_2$ but a low content of NO.

In other applications, e.g. when the content of NO in the exhaust gases is proportionately high but the content of $NO_2$ is low, it might be desirable to arrange the layered structure 16 in the opposite way, i.e. the first zeolite outside the second zeolite.

According to one embodiment of the porous material, a layered structure is achieved by means of the second zeolite 15, which provides the second porous structure 5, 5', being crystallized onto the first zeolite 14, which provides the first porous structure 2, 2'. This can be done by means of so-called over-growth.

Another embodiment of the porous material aims at further reducing the occurrence of the earlier-mentioned, undesired second reaction. In this embodiment, the content of oxidation catalyst (OX) has been reduced in the outer layers 8 of the first zeolite by means of partial ion-exchange (indicated in FIG. 1). Methods for altering the penetration depth and dispersion of the catalytically active metals are well-known to the skilled person and will not be described in any greater detail.

In another embodiment of the porous material, an additional zeolite crystal layer with a reduced content of oxidation catalyst (OX) is crystallized onto the first zeolite, by means of so-called over-growth. Thereby, the additional layer advantageously comprises a zeolite which provides a porous structure with even smaller pores/entrances than the first zeolite. In this manner, undesired reducing agent can more effectively be prevented from getting inside the internal pore structure of the first zeolite, at the same time as the nitrogen oxide (NO) will be admitted and can move freely inside said internal pore structure.

Also, the dimensions of the crystal grains in the zeolite crystal structures can be used in order to facilitate desired chemical reactions, and in order to prevent undesired chemical reactions. Different crystal structures can be achieved in several different ways, e.g. by means of the choice of the crystallization conditions and the choice of zeolite type. Also, the internal pore structure of the zeolites is influenced by the choice of zeolite type.

Thus, according to one embodiment of the porous material, the size 9 and shape of the crystal grains in the crystal structure of the first zeolite, has been optimized both in order to prevent access for the reducing agent (HC), and in order to allow oxidation of NO to $NO_2$. The optimization of the grain size is important since it makes it possible to maximise the oxidation of NO into $NO_2$, and to minimize the oxidation of HC.

In another embodiment of the porous material, a proportionately small pore size, in the crystal structure of the first zeolite which provides the first porous structure 2, 2', has been achieved by means of selecting a Ferrierite-zeolite or a Chabazite-zeolite, and not e.g. a Mordenite-zeolite.

As earlier mentioned, the porous material according to the present invention has the ability to catalyse oxidization of nitrogen monoxide (NO) into nitrogen dioxide ($NO_2$), and preferably also the ability to selectively catalyse reduction of nitrogen dioxide ($NO_2$) into nitrogen ($N_2$) in the presence of a reducing agent (HC). Thereby, the reducing agent (HC) may be any suitable reducing agent which is present in, or added to, the exhaust gases which are to be catalytically converted.

It is an advantage, however, if the reducing agent (HC) in the exhaust gases is a hydrocarbon ($H_xC_y$) or a chemical compound comprising oxygen and sulphur ($H_xC_yO_zS_w$). These compounds can originate from the fuel which is combusted and will, as earlier mentioned, be at least partially consumed according to the earlier-mentioned third reaction 6 over the reduction catalyst (RED). Alternative fuels, e.g. rape methyl ether, may produce oxygen-containing compounds, whereas sulphur is frequently present in most fuels.

The reduction catalyst (RED) in the second porous structure 5, 5' might be of any suitable, previously known type. However, in the porous material according to the present invention, the reduction catalyst (RED) preferably comprises Brönstedt acid sites, and silver (Ag), copper (Cu) or Rhodium (Rh), Cobalt (Co), Indium (In), Iridium (Ir) or combinations thereof. In the porous material according to the present invention, acidic zeolite catalysts are preferred as reduction catalysts (RED).

The oxidation catalyst (OX) may be of any type suitable for the purpose, but preferably comprises platinum (Pt) and/or Palladium (Pd).

The herein used term "porous material" should be regarded as including the entire structure/mass which might be present inside a unit for the catalytic conversion of exhaust gases. Accordingly, the term "porous" should be understood both in a microscopic and in a macroscopic sense, i.e. the porous material could comprise elements which in themselves are not porous to exhaust gases. However, the material structure as a whole, i.e. the "porous material" according to the present invention, will allow the exhaust gases which are to be catalytically converted to pass through. It should also be noted that embodiments wherein the porous material is composed of several separated parts, having different structures and functions, are conceivable, as long as they are used in the same catalytic conversion process.

The porous material, according to the present invention, may be coated onto one or several suitable substrates 18 or matrixes in order to provide a carrier or several carriers which comprise the first or/and the second porous structures. Suitable substrates for this purpose are well-known from the prior art, and will not be described in any greater detail, especially since they are of minor importance for the present invention.

Accordingly, the substrate 18 may be a metal substrate of a previously known type. The substrate 18 may also be a supporting, previously known, honeycomb structure of a suitable material, with or without catalytic activity.

It should also be noted that the term "porous structure" used herein should be understood as to include both micro-pores and macro-pores of the porous material. Accordingly, internal micro-pores, cavities between carrier particles, channels inside or through the porous material, etc., are all included within the scope of "porous structure".

For instance, there is no need for the second porous structure 5, 5 to be an internal micro-pore structure inside a carrier material, but the second porous structure 5, 5' could instead be provided by a more open, macroscopic structure. The first porous structure 2, 2', however, is preferably an internal micro-structure inside a carrier material, in order to provide sufficient sterical hindrance against the admittance of the (undesired) reducing agent into the sites where the oxidation catalyst is situated.

In the following discussion, a method for catalytic conversion of exhaust gases, according to the present invention, will be described in greater detail with reference to the attached FIGS. 1 and 5. The method according to the present invention comprises oxidation of nitrogen monoxide (NO) into nitrogen dioxide ($NO_2$) over an oxidation catalyst (OX), according to a first reaction 3 (FIG. 1). The oxidation catalyst (OX) in itself has the ability to catalyse oxidation of a reducing agent (HC), according to a second reaction (not present in FIG. 1). According to the present invention, however, the reducing agent (HC) is sterically prevented 4, 4' from coming into contact with the oxidation catalyst (OX). As a result of this, primarily the first reaction 3, out of the first and second reactions, takes place over the oxidation catalyst (OX).

According to one embodiment of the present invention, the method further comprises reduction of nitrogen dioxide ($NO_2$) into nitrogen ($N_2$) over a reduction catalyst (RED) in the presence of a reducing agent (HC), according to a third reaction 6. Thereby, the reducing agent (HC) participates in the third reaction 6 and is at least partially consumed. In this way, catalytically converted exhaust gases 12' (FIG. 5), having a reduced content of nitrogen monoxide (NO), nitrogen dioxide ($NO_2$) and reducing agent (HC) and a proportionately low content of dinitrogen oxide ($N_2O$), are obtained. Furthermore, the converted exhaust gases will have a reduced content of carbon monoxide (CO).

Figure 5:
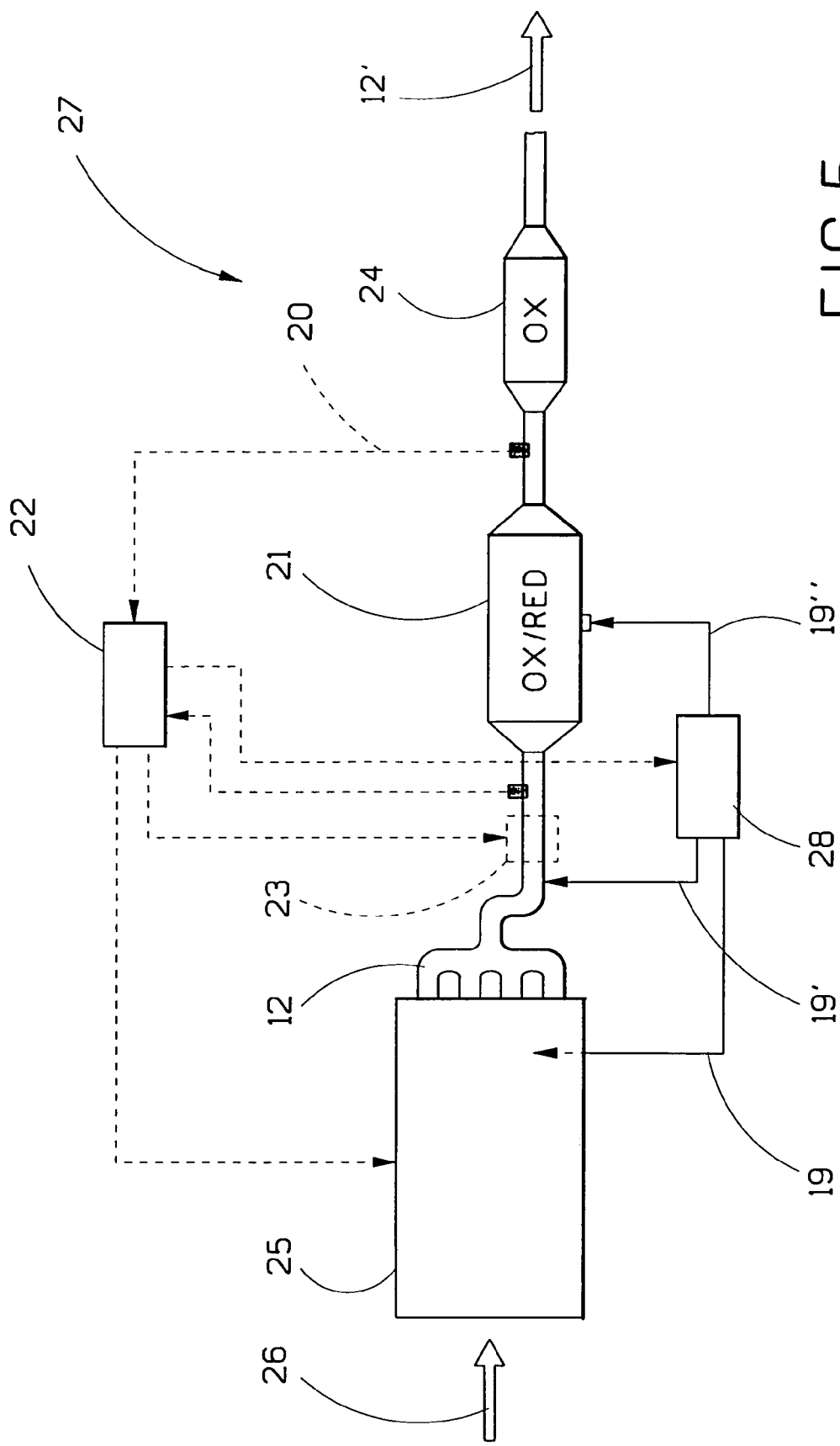
FIG. 5 is a side, elevational, schematic process diagram of an arrangement for catalytic conversion of exhaust gases according to the present invention.

When desirable, an additional amount, 19, 19', or 19", of reducing agent (HC) can be added with a suitable injection device 28, before reduction takes place over the reduction catalyst (RED), according to the third reaction 6 (FIGS. 1 and 5). In this manner, the stochiometrics of the occurring chemical reactions can be influenced so that the catalytic conversion becomes as complete as possible. In internal combustion engines, it is also possible to increase or regulate the amount of available reducing agent by means of so-called engine parameter tuning. This can be done by e.g. fuel injection timing, valve timing, post-injection, control of charging pressure and/or fuel injection pressure, EGR, transmission ratio, etc.

Advantageously, the additional amount, 19, 19', or 19", of reducing agent (HC) can be regulated on the basis of a measured or previously mapped content 20 of reducing agent (HC) and/or nitrogen oxides ($NO_x$) in the exhaust gases 12, 12'.

The measured content 20 of reducing agent (HC) or nitrogen oxides ($NO_x$) in the catalytically converted exhaust gases (12') can also be used in a diagnostic control system 22, providing an indication of the status of the catalytic conversion.

The exhaust gases 12 can also be passed through a device having the ability to store and when necessary release nitrogen oxides ($NO_x$) before oxidation over the oxidation catalyst (OX), according to the first reaction 3. Such $NO_x$-absorbers are well-known to the person skilled in the art, and will not be described in any greater detail herein. Before the oxidation, the exhaust gases 12 can also be passed through a previously known device having the ability to store, and when necessary release, reducing agent (HC), e.g. hydrocarbon. This embodiment is useful for e.g. cold starts of an internal combustion engine.

In order to ensure that the oxidation catalyst (OX) and/or the reduction catalyst (RED) is functioning in the best possible way, i.e. are within an active temperature interval, the temperature of the exhaust gases can be regulated before the passage through the porous material 21 according to the present invention. This can be done with any previously known device 23 which is suitable for the purpose.

In order to further improve the catalytic conversion, the exhaust gases can be allowed to pass a second oxidation catalyst 24, over which oxidation of residues of reducing agent and/or carbon monoxide can take place. In this way, it is ensured that the exhaust gases, which have been at least partially catalytically converted over the porous material 21, reach a sufficiently high degree of catalytic conversion.

It is advantageous for the method of the present invention if the exhaust gases 12 originate from an internal combustion engine 25, and the reducing agent (HC) comprises a hydrocarbon ($H_xC_y$) and/or a chemical compound ($H_xC_yO_zS_w$) further comprising oxygen and/or sulphur.

Furthermore, the fuel 26 consumption of the internal combustion engine 25 will influence the chemical composition of the exhaust gases 12. Legislative regulations are imposed both on fuel consumption and the residue content of nitrogen oxides ($NO_x$) in the catalytically converted exhaust gases 12'. In one embodiment of the present invention, both the fuel consumption of the internal combustion engine, and the residue content of nitrogen oxides ($NO_x$) in the catalytically converted exhaust gases 12', are regulated in order to fulfil the relevant legislative regulations.

In one preferred embodiment of the method according to the present invention, the internal combustion engine 25 is a diesel engine and the reducing agent (HC) originates from internal combustion in said diesel engine.

When diesel engines are concerned, an additional amount 19 of reducing agent (HC) can advantageously be supplied to the engine via a fuel injector of the diesel engine and/or via a separate injector for additional reducing agent.

It is preferred to use a porous material according to the present invention, for catalytic conversion of exhaust gases 12, which have an oxygen surplus and, accordingly, are difficult to convert in conventional catalytic converters, e.g. three-way converters. In such use, the porous material provides functions both for the oxidation of nitrogen monoxide (NO) into nitrogen dioxide ($NO_2$) and for the reduction of nitrogen dioxide ($NO_2$) into nitrogen ($N_2$).

It is also preferred with an arrangement 27, according to the present invention, for catalytic conversion of exhaust gases which originate from an internal combustion engine 25. Thereby, the arrangement comprises a porous material 21 according to the present invention or, furthermore, operates through a method according to the present invention.

EXAMPLE

In order to more clearly illustrate the basic principles of the present invention, a number of porous samples, i.e. model catalyst materials, were produced in a series of laboratory trials.

In the laboratory trials, zeolites of the basic types Mordenite, Ferrierite and Chabazite were used in order to provide catalyst carriers.

The different zeolite types had the following channel/pore dimensions:
Mordenite: free diameter: 12 rings 6.5×7.0 Å 8 rings 2.6×5.7 Å
Ferrierite: free diameter: 10 rings 4.2×5.4 Å 8 rings 3.5×4.8 Å
Chabazite: free diameter: 8 rings 3.8×3.8 Å

As evident from above, the selected zeolites had either 8 rings, 10 rings or 12 rings, providing entrances into their internal micro-pore structure. The selected zeolite raw materials were provided in the form of $NH_4$-zeolites.

Preparation of platinum-zeolites (Pt):

Samples of the different $NH_4$-zeolites were calcined during 1 hour at 500° C. under oxygen flow in order to transfer the zeolites into acidic form, i.e into H-zeolites. Amounts of 0.5 wt-%, 1.0 wt-% or 1.5 wt-% of platinum (PT) were loaded onto the H-zeolites by means of contacting them with an aqueous solution of $Pt(NH_3)_4(OH)_2$. Thereby, the 0.01 M Pt-solution was added dropwise to zeolite dispersed in water. The obtained mixtures were stirred during 24 hours at room temperature, filtered, washed with $H_2O$, and dried overnight at 60° C. Thereafter, the samples were calcined during 2 hours at 450° C. in dry air, with a rate of 0.5° C. ×$min^-$, whereafter the samples were cooled down in a $N_2$-flow.

Methods for Pt-loading are described in greater detail in the publications J. Catal. 113 (1988), p. 220–235 (Tzou et al.) and J. Catal. 117 (1989), p. 91–101 (Homeyer et al.).

Preparation of silver-zeolite (Ag):

Ag-zeolites were produced by loading 5 wt-% Ag onto the different $NH_4$-zeolites by means of impregnation with $AgNO_3$, using the so-called "incipient wetness" method. Thereby, the metal salt ($AgNO_3$) was dissolved in a minimum of water (1 ml/gram of zeolite), whereafter the obtained solution was mixed with the zeolite powders. Finally, the samples were calcined during 16 hours at 550° C. in a muffle furnace and stored in the dark until evaluation took place.

Evaluation of Catalytic Conversion Efficiency:

Before the evaluation, the obtained Pt-zeolites and Ag-zeolites, and physical mixtures of these, were compressed into pellets, i.e. model porous samples, and the catalytic conversion efficiency of the different porous samples was evaluated.

In the prepared porous samples, the Pt-zeolites were intended to provide the earlier-mentioned NO-oxidation function, whereas the Ag-zeolites were intended to provide the earlier-mentioned $NO_2$-reduction function.

The evaluation of the catalytic conversion efficiency was performed by means of inserting a small amount (0.3 ml) of porous sample, into a device suitable for the purpose of evaluating catalytic conversion efficiency. Thereafter, a gas flow of 300 ml/min, with the composition 500 ppm NO, 350 ppm $C_8H_{18}$, 6% $O_2$, 12% $H_2O$, 10% $CO_2$ and 350 ppm CO, was passed through the sample chamber in which the porous material sample was placed. The temperature was increased step-wise from 140 to 500° C., while the composition of the catalytically converted exhaust gases from the sample chamber was detected.

The catalytic conversion efficiency for some of the different porous samples, comprising the different zeolites and physical mixtures of these, is evident from Table 1 below.

Table 1 lists the temperature at which the maximum conversion of NO to $N_2$ was obtained, the total $NO_x$-conversion at this temperature, and the formation of $N_2$ and $N_2O$, respectively, at this temperature. It should be noted that conversion into $N_2$ is desired in this case, while conversion into $N_2O$ is undesired.

TABLE 1

| SAMPLE | T (° C.) max. $N_2$ conv. | % $NO_x$ conv. | % formation $N_2$ | % formation $N_2O$ |
|---|---|---|---|---|
| 1 wt % Pt-CHA 30% 5 wt % Ag-MOR 70% | 280 | 44 | 32 | 12 |
| 1.5 wt % Pt-MOR 30% 5 wt % Ag-CHA 70% | 220 | 100 | 19 | 81 |
| 1 wt % Pt-MOR 100% | 200 | 100 | 29 | 71 |
| 1 wt % Pt-CHA 100% | 260 | 16 | 3 | 9 |
| 5 wt % Ag-CHA 100% | 500 | 37 | 35 | 2 |

The results in Table 1 indicate that the highest total $NO_x$-conversion will be achieved with porous samples comprising zeolites of Pt-Mordenite type. However, the strong formation of dinitrogen oxide ($N_2O$) with Pt-Mordenite is a draw-back. The combined Pt-CHA/Ag-MOR sample exhibited very high conversion of $NO_x$ into $N_2$. Also the Ag-CHA sample exhibited a high conversions of $NO_2$ to $N_2$ but only at a very high temperature (500° C.), which is impractical for many applications.

In Table 2 below, the catalytic conversion efficiency from further evaluations of different zeolites, and physical mixtures of same, are listed. The catalytic conversion efficiency is listed both for the case when the hydrocarbon ($C_8H_{18}$) in the supplied gas mixture is a linear alkane, i.e. n-octane, and for the case when the hydrocarbon ($C_8H_{18}$) is a strongly branched iso-paraffin, i.e. iso-octane (more specifically 2,2,4-tri-methylpentane).

TABLE 2

| SAMPLE | T (° C.) max. $N_2$ conv. | % $NO_x$ conv. n-$C_8H_{18}$ | % $NO_x$ conv. iso-$C_8H_{18}$ | % formation $N_2$ n-$C_8H_{18}$ | % formation $N_2$ iso-$C_8H_{18}$ | % formation $N_2O$ n-$C_8H_{18}$ | % formation $N_2O$ iso-$C_8H_{18}$ |
|---|---|---|---|---|---|---|---|
| 0.5 wt % Pt-FER 30% 5 wt % Ag-FER 70% | 280 | 32 | 19 | 8 | 4 | 24 | 15 |
| 1.5 wt % Pt-MOR 20% 5 wt % Ag-FER 80% | 260 | 30 | 32 | 4 | 8 | 26 | 24 |
| 0.5 wt % Pt-FER 30% 5 wt % Ag-MOR 70% | 260 | 56 | 86 | 23 | 58 | 33 | 28 |
| 0.5 wt % Pt-FER 100% | 240 | 62 | 16 | 15 | 9 | 47 | 7 |
| 5 wt % Ag-MOR 100% | 360 | 15 | 15 | 13 | 13 | 2 | 2 |

As is evident from Table 2, the sample comprising Pt-Ferrierite alone (Pt-FER) provided a very high total $NO_x$-conversion when the supplied hydrocarbon is a linear hydrocarbon, i.e. n-octane. This is a result from reaction of the linear hydrocarbon over the Pt-catalyst, according to the earlier mentioned reaction F):

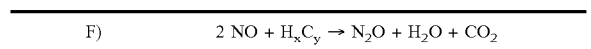

F)    $2 NO + H_xC_y \rightarrow N_2O + H_2O + CO_2$

As a result of this reaction, the formation of undesired dinitrogen oxide $N_2O$ is very high when supplying the linear hydrocarbon.

When instead the strongly branched iso-octane was supplied to the Pt-FER sample, the total $NO_x$-conversion dropped drastically. The reason for this is that the strongly branched iso-octane is sterically prevented from coming into contact with the Pt-catalyst, because of the rather small entrances into the internal pore structure of the Pt-Ferrierite, inside of which the main portion of the Pt-catalyst is located. The linear hydrocarbon, on the other hand, is not sterically prevented from coming into contact with the Pt-catalyst in the internal pore structure, and therefore reaction F) can take place and consume NO.

As is also evident from Table 2, the porous sample comprising Ag-Mordenite alone provides a fairly low total $NO_x$-conversion, and there is no difference in conversion efficiency when supplying n-octane and iso-octane, respectively. This result indicates that the strongly branched iso-octane is not sterically prevented from coming into contact with the Ag-catalyst to any higher extent than the linear n-octane. The reason for the low total $NO_x$-conversion in this case is that the amount of nitrogen dioxide ($NO_2$) in the test gas is to small to allow the earlier mentioned reaction C) to take place over the Ag-catalyst:

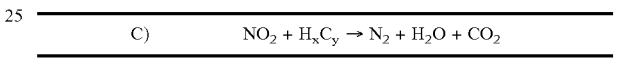

C)    $NO_2 + H_xC_y \rightarrow N_2 + H_2O + CO_2$

From these results, it can be concluded that Ferrierite-zeolites will admit linear hydrocarbons into their internal pore structure, but will not admit strongly branched hydrocarbons. Furthermore, it can be concluded that Mordenite-zeolites will admit both linear and strongly branched hydrocarbons into their internal pore structure.

Accordingly, a mixture of Pt-Ferrierite and Ag-Ferrierite should admit linear hydrocarbons, e.g. n-octane, and allow the four following reactions to take place over the combined Pt/Ag-catalyst sample:

| D) | $NO + 1/2 O_2 \leftrightarrows NO_2$. | (over Pt) |
|---|---|---|
| E) | $O_2 + H_xC_y \rightarrow H_2O + CO_2$ | (over Pt) |
| F) | $2 NO + H_xC_y \rightarrow N_2O + H_2O + CO_2$ | (over Pt) |
| C) | $NO_2 + H_xC_y \rightarrow N_2 H_2O + CO_2$ | (over Ag) |

When the branched iso-octane is supplied instead, there will be less reaction according to reactions E), F) and C), since the branched iso-octane is at least partially sterically prevented from participating. The result of this is that the total $NO_x$-conversion drops, when supplying the branched iso-octane, as is evident from Table 2 (Pt-FER/Ag-FER). This is further illustrated by the attached Graphs 1A and 1B.

When using a porous material comprising a combination of Pt-Ferrierite and Ag-Mordenite (Pt-FER/Ag-MOR), the linear n-octane will have access into the internal pore structures of both the Pt-Ferrierite and the Ag-Mordenite. Accordingly, all four reactions D, E, F and C can take place. This results in a rather high total $NO_x$-conversion when supplying linear n-octane, as can be seen from the results in Table 2.

As earlier discussed, the branched iso-octane is sterically prevented from getting into the pore structure of a Ferrierite-zeolite, but is not prevented from getting into the pore structure of a Mordenite-zeolite. Accordingly, when a branched hydrocarbon, e.g. iso-octane, is supplied to the physical mixture of Pt-Ferrierite and Ag-Mordenite, the reactions D and C will be predominant:

| | | |
|---|---|---|
| D) | NO + 1/2 O$_2$ ⇌ NO$_2$. | (over Pt) |
| C) | NO$_2$ + H$_x$C$_y$ → N$_2$ + H$_2$O + CO$_2$ | (over Ag) |

This is indicated in Table 2 (Pt-FER/Ag-MOR) as a surprising increase of the total NO$_x$-conversion, and a pronounced decrease of the relative N$_2$O-formation, when the branched iso-octane is supplied instead of the linear n-octane. This effect is very useful for improving the catalytic conversion efficiency, and is further illustrated in the attached Graphs 2A and 2B.

Consequently, according to the present invention, it is an advantage to sterically prevent hydrocarbons, or other reducing agents, from being oxidized according to reactions E) and/or F). A number of further conclusions can be drawn from this fact. This is also the basic principle which the present invention relies upon, as already has become evident from the earlier description.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A porous material for use in the catalytic conversion of exhaust gases comprising a first porous structure, a second porous structure, and an oxidation catalyst capable of catalyzing the oxidation of NO to NO$_2$ in the presence of oxygen and catalyzing the oxidation of a reducing agent, said oxidation catalyst enclosed within said first porous structure, said first porous structure including pores having dimensions such that said reducing agent is sterically prevented from contacting said oxidation catalyst, whereby said oxidation catalyst primarily catalyzes said oxidation of said NO to NO$_2$ as compared to said oxidation of said reducing agent during the catalytic conversion of said exhaust gases, said second porous structure being substantially free of said oxidation catalyst.

2. The porous material of claim 1 including a reduction catalyst capable of selectively catalyzing the reduction of NO to N$_2$ in the presence of a reducing agent, said reduction catalyst disposed in said second porous structure, said second porous structure including pores having a dimension such that said reducing agent can contact said reduction catalyst, whereby said reduction catalyst can catalyze said reduction of NO$_2$ to N$_2$ in the presence of said reducing agent.

3. The porous material of claim 2 wherein said pores of said first porous structure are generally smaller than said pores of said second porous structure.

4. The porous material of claim 3 wherein said pores of said first porous structure have an effective size of from about 3–6 angstroms.

5. The porous material of claim 2 wherein said first and second porous structures are provided in the same layer or coating of said porous material.

6. The porous material of claim 2 wherein said first and second porous structures are provided in different layers or coatings of said porous material.

7. The porous material of claim 2 wherein said second porous structure has been adapted to the molecular size or absorption properties of said reducing agent.

8. The porous material of claim 2 wherein the ratio of said oxidation catalyst to said reduction catalyst is optimized, whereby said oxidation of NO to NO$_2$ substantially corresponds to said reduction of NO$_2$ to N$_2$.

9. The porous material of claim 2 comprising a first portion of said porous material disposed to initially receive said exhaust gas and a second portion of said porous material disposed to subsequently receive said exhaust gas, and wherein said first portion of said porous material includes more of said oxidation catalyst than said reduction catalyst and said second portion of said porous material includes more of said reduction catalyst than said oxidation catalyst.

10. The porous material of claim 2 wherein at least one of said first and second porous structures comprises a zeolite crystal structure.

11. The porous material of claim 10 wherein said first porous structure comprises a first zeolite and said second porous structure comprises a second zeolite.

12. The porous material of claim 11 comprising a physical mixture of said first and second zeolites.

13. The porous material of claim 11 comprising a layered structure comprising layers of said first and second zeolites.

14. The porous material of claim 13 wherein said layers of said first and second zeolites are arranged so that said second zeolite structure will contact said exhaust gases before said first zeolite structure.

15. The porous material of claim 11 wherein said second zeolite is applied by overgrowth onto said first zeolite.

16. The porous material of claim 11 wherein said first zeolite includes an outer surface and an inner surface, and the content of said oxidation catalyst in said outer surface of said first zeolite has been reduced as compared to the content of said oxidation catalyst in said inner surface by means of regulating the penetration depth or dispersion thereof.

17. The porous material of claim 11 including an additional crystal zeolite layer crystallized onto said first zeolite, said additional crystal zeolite layer including a reduced content of said oxidation catalyst.

18. The porous material of claim 11 wherein said first zeolite comprises crystal grains having optimized crystal grain sizes and shapes, whereby access of said reducing agent thereto is reduced and the effective oxidation of said NO to NO$_2$ is carried out.

19. The porous material of claim 11 wherein said first zeolite is selected from the group consisting of Ferrierite and Chabazite.

20. The porous material of claim 2 wherein said reducing agent comprises a hydrocarbon or a hydrocarbon including oxygen or sulfur.

21. The porous material of claim 2 wherein said reduction catalyst comprises an acidic zeolite catalyst.

22. The porous material of claim 2 wherein said reduction catalyst comprises a Brönstedt acid catalyst.

23. The porous material of claim 22 wherein said Brönstedt acid catalyst is selected from the group consisting of silver, copper, Rhodium, Indium, Iridium and combinations thereof.

24. The porous material of claim 1 wherein said oxidation catalyst is selected from the group consisting of platinum, palladium and mixtures thereof.

25. The porous material of claim 2 disposed on a substrate, wherein at least one of said first and second porous structures are attached to said substrate.

26. A porous material for use in the catalytic conversion of exhaust gases comprising a first porous structure having an outer layer, an oxidation catalyst capable of catalyzing the oxidation of NO to $NO_2$ in the presence of oxygen and catalyzing the oxidation of a reducing agent, said oxidation catalyst enclosed within said first porous structure and substantially excluded from said outer layer thereof, said first porous structure including pores having dimensions such that said reducing agent is sterically prevented from contacting said oxidation catalyst, whereby said oxidation catalyst primarily catalyzes said oxidation of said NO to $NO_2$ as compared to said oxidation of said reducing agent during the catalytic conversion of said exhaust gases.

27. The porous material of claim 26 including a second porous structure, and including a reduction catalyst capable of selectively catalyzing the reduction of NO to $N_2$ in the presence of a reducing agent, said reduction catalyst disposed in said second porous structure, said second porous structure including pores having a dimension such that said reducing agent can contact said reduction catalyst, whereby said reduction catalyst can catalyze said reduction of $NO_2$ to $N_2$ in the presence of said reducing agent.

28. The porous material of claim 27 wherein said pores of said first porous structure are generally smaller than said pores of said second porous structure.

29. The porous material of claim 28 wherein said pores of said first porous structure have an effective size of from about 3–6 angstroms.

30. The porous material of claim 27 wherein said first and second porous structures are provided in the same layer or coating of said porous material.

31. The porous material of claim 27 wherein said first and second porous structures are provided in different layers or coatings of said porous material.

32. The porous material of claim 27 wherein said second porous structure has been adapted to the molecular size or absorption properties of said reducing agent.

33. The porous material of claim 27 wherein the ratio of said oxidation catalyst to said reduction catalyst is optimized, whereby said oxidation of NO to $NO_2$ substantially corresponds to said reduction of $NO_2$ to $N_2$.

34. The porous material of claim 27 comprising a first portion of said porous material disposed to initially receive said exhaust gas and a second portion of said porous material disposed to subsequently receive said exhaust gas, and wherein said first portion of said porous material includes more of said oxidation catalyst than said reduction catalyst and said second portion of said porous material includes more of said reduction catalyst than said oxidation catalyst.

35. The porous material of claim 27 wherein at least one of said first and second porous structures comprises a zeolite crystal structure.

36. The porous material of claim 35 wherein said first porous structure comprises a first zeolite and said second porous structure comprises a second zeolite.

37. The porous material of claim 36 comprising a physical mixture of said first and second zeolites.

38. The porous material of claim 36 comprising a layered structure comprising layers of said first and second zeolites.

39. The porous material of claim 38 wherein said layers of said first and second zeolites are arranged so that said second zeolite structure will contact said exhaust gases before said first zeolite structure.

40. The porous material of claim 36 wherein said second zeolite is applied by overgrowth onto said first zeolite.

41. The porous material of claim 36 wherein said first zeolite comprises crystal grains having optimized crystal grain sizes and shapes, whereby access of said reducing agent thereto is reduced and the effective oxidation of said NO to $NO_2$ is carried out.

42. The porous material of claim 36 wherein said first zeolite is selected from the group consisting of Ferrierite and Chabazite.

43. The porous material of claim 27 wherein said reducing agent comprises a hydrocarbon or a hydrocarbon including oxygen or sulfur.

44. The porous material of claim 27 wherein said reduction catalyst comprises an acidic zeolite catalyst.

45. The porous material of claim 27 wherein said reduction catalyst comprises a Brönstedt acid catalyst.

46. The porous material of claim 45 wherein said Brönstedt acid catalyst is selected from the group consisting of silver, copper, Rhodium, Indium, Iridium and combinations thereof.

47. The porous material of claim 26 wherein said oxidation catalyst is selected from the group consisting of platinum, palladium and mixtures thereof.

48. The porous material of claim 27 disposed on a substrate, wherein at least one of said first and second porous structures are attached to said substrate.

* * * * *